United States Patent
Cronmiller

(10) Patent No.: US 8,278,826 B2
(45) Date of Patent: Oct. 2, 2012

(54) MULTIMODE CONTROLLER FOR LED LIGHT SOURCES

(75) Inventor: James J. Cronmiller, West Henrietta, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 892 days.

(21) Appl. No.: 12/316,527

(22) Filed: Dec. 12, 2008

(65) Prior Publication Data

US 2012/0074869 A1    Mar. 29, 2012

(51) Int. Cl.
*B60Q 1/26* (2006.01)

(52) U.S. Cl. .......... 315/80; 315/291; 315/295; 315/312; 315/77

(58) Field of Classification Search .................. 315/291, 315/312, 313, 307, 76, 78, 80, 363, 362, 315/294, 295, 297; 340/815.45
See application file for complete search history.

(56) References Cited

U.S. PATENT DOCUMENTS

| | | | |
|---|---|---|---|
| 6,046,686 A * | 4/2000 | Mitchell et al. | 340/936 |
| 6,461,008 B1 | 10/2002 | Pederson | |
| 6,696,799 B2 | 2/2004 | Vukosic | |
| 6,858,986 B2 * | 2/2005 | Monk | 315/76 |
| 7,036,965 B2 | 5/2006 | Dalton, Jr. et al. | |
| 2002/0084890 A1 * | 7/2002 | Guerrieri et al. | 340/332 |
| 2005/0012636 A1 * | 1/2005 | Gallagher et al. | 340/815.45 |
| 2006/0269897 A1 * | 11/2006 | Gill et al. | 433/29 |
| 2008/0074874 A1 * | 3/2008 | Bradshaw et al. | 362/235 |
| 2010/0014274 A1 * | 1/2010 | Shyu et al. | 362/11 |

* cited by examiner

*Primary Examiner* — Jacob Y Choi
*Assistant Examiner* — Ephrem Alemu
(74) *Attorney, Agent, or Firm* — Kenneth J. Lukacher; Martin Lukacher

(57) ABSTRACT

A multimode controller for LED light sources, especially sources in warning lights, such as light bars, provides for a temporary increase in brightness from the LEDs by providing a burst mode, in addition to a flashing mode and a continuous mode. The modes are carried out by programming a microprocessor which receives signals from control switches, which may be pressed and released. The programming precludes the burst mode to continue for longer than a predetermined time thereby ensuring that the power does not exceed the LEDs damage threshold characteristic. The controller thereby provides for temporary bursting to make visible the region in front of or around an emergency vehicle for a short period of time without the need for light sources dedicated solely to the high intensity brightness mode of operation of a warning light system.

9 Claims, 2 Drawing Sheets

MULTIMODE CONTROLLER FOR LED LIGHT SOURCES

Figure 1:
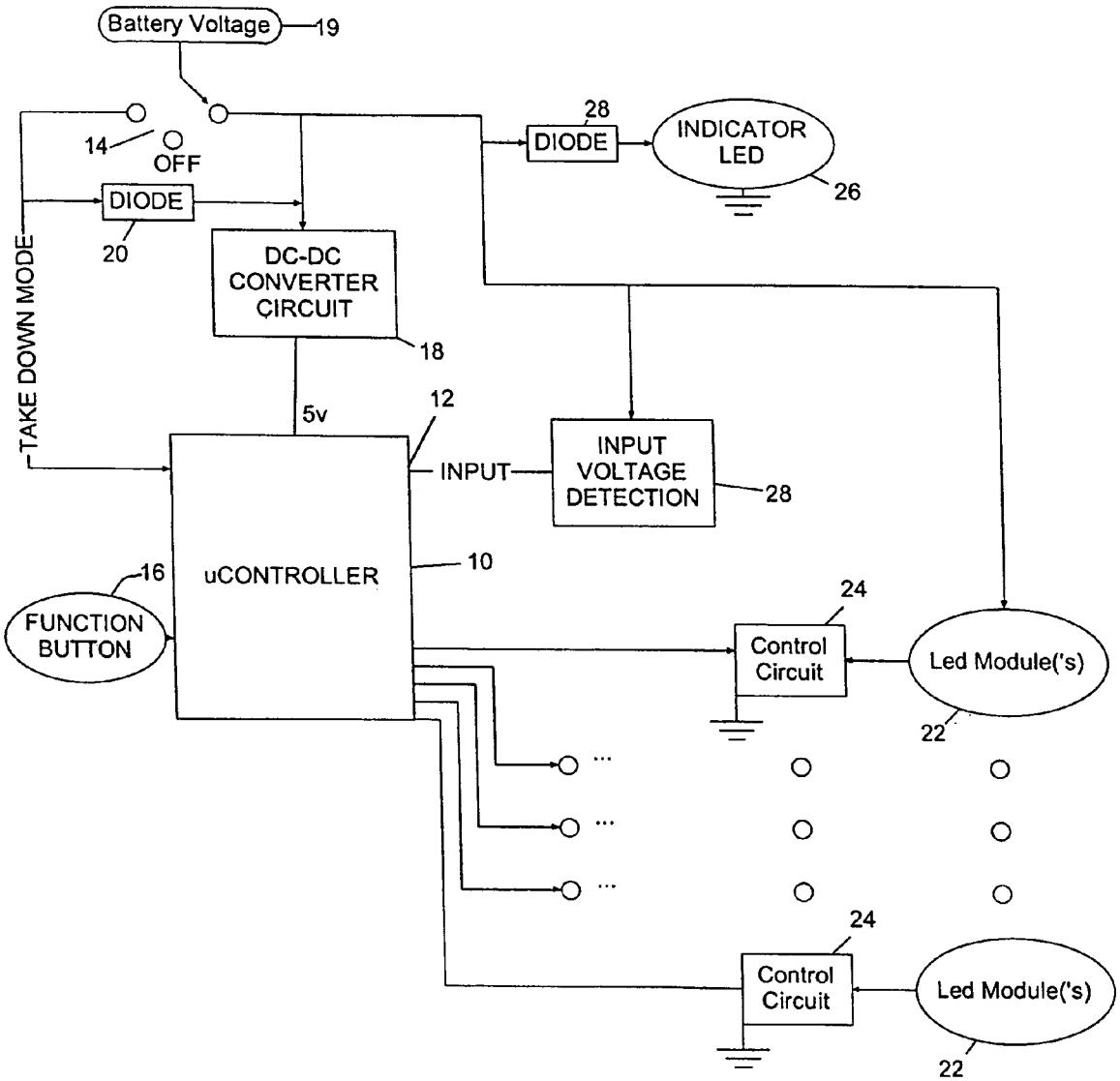

The present invention relates to a multimode controller for LED light sources which provides, with the same LED light sources, in addition to flashing or low intensity continuous illumination modes of operation, a temporary brightening or burst of illumination for increased visibility during emergency conditions while avoiding damage to the LED light sources. The invention is especially suitable for use in warning light systems which contain LED light sources, either in singular or multiple arrays, and more particularly in warning light bars. Such warning light bars and other warning systems which use LED light sources are shown for example in Dalton, Jr. et al., U.S. Pat. No. 7,036,965, and Pederson, U.S. Pat. No. 6,461,008.

It will be understood that the term LED light source includes not only light emitting light emitting diode sources, but also other light sources which have power damage thresholds. A power damage threshold results in damage or failure to the light source when the power applied thereto is exceeded. By power is meant the energy applied to the source. In the case of a battery or other electrical source, power is the wattage (the products of voltage, current, and time) during which the device is operated.

Heretofore, LED light sources have been operated either in flashing modes or in low power continuous modes (sometimes referred to as take-down modes in the case of light bars) in order to avoid damage to the LED during the operation thereof. Illumination brighter than that afforded by the LEDs in flashing or take-down mode, especially over a temporary period of time, has required the use of a separate light source which may be a stand alone source, or a source which is integrated in the light bar and contains an incandescent lamp or other device which is relatively immune to an overpower condition.

Accordingly, it is the principal object of the present invention to provide a multimode controller for one or more LED light sources, which is an integral unit, and is operated so that the LEDs can provide, temporarily, a burst of high brightness illumination, thereby avoiding the need for a separate or additional light source for the high brightness mode of operation thereof.

It is a further object of the present invention to provide an improved multimode controller which is computer controlled, as with a microprocessor, and which can implement a first mode in which the LEDs are operated in pulses or intermittently (flashing) or continuously, but at power levels less than full power from a source of operating power such as a battery; the controller also affording a second mode in which a temporary burst of power is applied to the LEDs under control of the microprocessor to provide greater brightness than provided in the first mode, the microprocessor limiting the duration of the burst mode so that the greater power drawn from the source-is for a period of time which is less than the laser damage threshold level characteristic of the LEDs.

Another feature of the multimode controller provided in accordance with the invention is to enable control switches, such as push buttons which turn on and off the burst mode, to be used to set the microcontroller to provide different flashing patterns during the flashing mode, and which is implemented by changing the function of the burst mode control button to a function button for pattern selection.

Briefly described therefore, a multimode controller for one or more LED light sources utilizes a source of power, such as a battery. Means are provided for selectively operating the LED light sources continuously or intermittently to provide at least a first mode of operation at less than the full power from the battery; that is when the power is not reduced as by pulse modulation at a pulse rate higher than the rate of persistence of vision where the observer cannot distinguish the higher pulse rate operation from continuous illumination (which higher pulse rate may be in a range of several hundred Hz). The first mode selecting means may be implemented by switches, such as push button switches and a computer controller. The controller also includes means for operating the LEDs temporarily in a second mode to continuously draw greater power from the battery than during the first mode, thereby enabling the LEDs to provide a burst of illumination of greater brightness than provided during the first mode. The switches and a programmed microprocessor providing the controller may implement the second or burst mode and prevents the LEDs from drawing full power for more than a short period of time, say for example with typical high intensity LEDs, less than thirty seconds. In order to preclude the LEDs from being operated in successive intermittent increments of time, the second or burst mode is preferably precluded from being enabled unless the burst mode has been off for more than thirty seconds.

Figure 2:
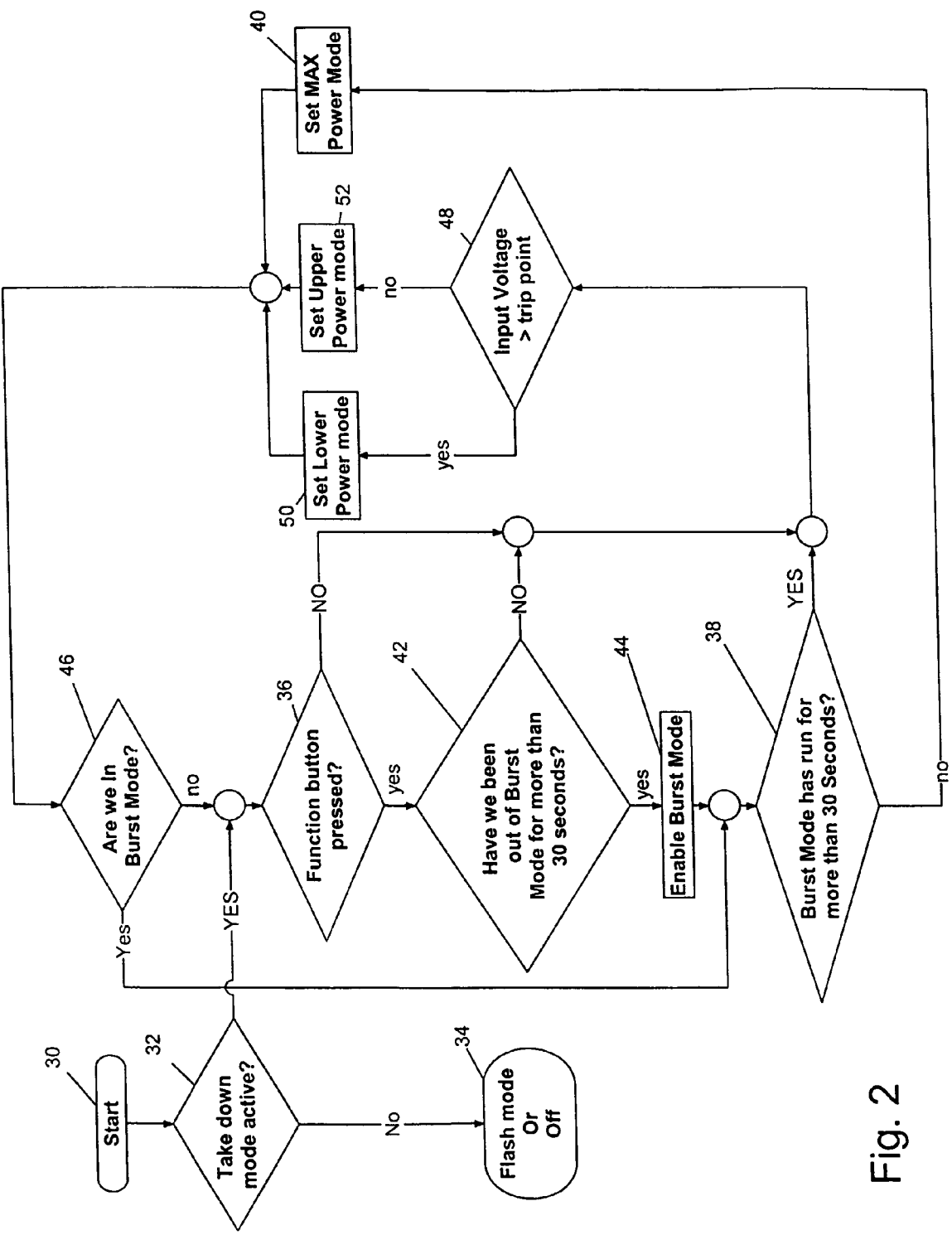

The foregoing and other objects, features and advantages of the invention will become more apparent from the reading of the following description in connection with the accompanying drawings in which:

FIG. 1 is a simplified block diagram of a multimode controller for LED light sources in accordance with the invention; and FIG. 2 is a flow chart indicating the programming of a computer (which may be a microprocessor or microcontroller) shown in FIG. 1 in order to obtain operation in first (flashing or low intensity continuous) mode and in the burst mode while insuring safe and reliable operation during the burst mode by preventing the power threshold limit of the LEDs from being exceeded.

Referring first to FIG. 1, the microcontroller 10 is a computer which preferably is in the form of a microprocessor having an analog input 12. Power to the microcontroller 10 is provided by a DC-DC converter circuit 18, such as used in warning lamps of the strobe lamp type, see for example, U.S. Pat. No. 6,696,799 to Vukosic. Inputs to the control ports of the microcontroller 10 are from a rocker or 3-position push button type toggle switch 14 and a push button switch 16 which provides different functions, such as selection of different flashing or pulse sequences and which implements the burst mode. The switch 14 has three positions. The first mode, namely a flashing mode and a continuous or take-down mode, is implemented by pressing and releasing the switch 14; the flashing mode being turned off then on to change the flashing mode to the take-down or continuous mode. The switch 14 switches battery power identified by 19, from a battery, not shown, which may be a typical vehicle battery having a 12-volt output voltage. The system, however, is designed to operate with battery voltages from ten to sixteen volts and nevertheless provide the same brightness illumination level during the flashing or continuous—take-down modes.

When the flashing mode is selected, power is applied to a DC-DC converter circuit 18 of the type referred to in the above referenced Vukosic patent. Voltage from the battery is applied through a diode 20 when the take-down mode is selected by the switch 14. The microcontroller 10 has outputs to the LED light sources which may be contained in a plurality of LED modules 22. Current through the modules 22 is through control circuits 24, which may be provided by switching transistors and which are enabled by the outputs of the microcontroller 10. An indicator LED 26 is powered from the battery via the switch 14 and the diode 20 and another diode 28 to indicate that the multimode controller shown in FIG. 1 is on and operating the LED modules 22.

The variations in battery voltage are handled by the microprocessor 10 which senses the battery voltage at its analog input port 12. This voltage may be dropped down to desired level by a voltage divider which affords the voltage detector 28. During the first mode, pulse width modulated pulses of current above the persistence of vision rate is passed, through to the LED modules 22, in which the duty cycle of the pulses is varied inversely in accordance with the input voltage so as to compensate for the changes in battery voltage. During the flashing mode, there are pulse bursts which may be in different sequences, such as for example bursts which are one second apart from each other (one second period of the flashing). Other patterns or sequences a flashing may be selected utilizing the function button 16, but only when the flashing mode is enabled. In the flashing mode, the rate, or on time of the pulses, may be from 65% to 85% of a maximum rate, for e.g., 1 KHz. If the take down mode is selected, the pulse rate above persistence of vision pulses may vary from 35% to 50% of the maximum pulse rate. The LEDs are not on continuously at their maximum pulse rate, but at a lower rate which corresponds to a power level below the power damage threshold of the LEDs.

The burst mode is implemented by the function button 16, but only from the take-down mode. Accordingly, if the flashing mode is selected via switch 14, the function button 16 may be used to select different flashing patterns; a different pattern being selected upon each depression of the button 16. This provides for dual use of the function button and with accompanying convenience of operation and cost savings above what would be the case if different buttons were used.

When the burst mode is implemented, the full battery voltage is applied to the LEDs in the LED modules 22, but only for a short period of time and only if the burst mode has been off for a sufficient period of time to preclude power damage threshold from being exceeded, as will be more apparent from FIG. 2. The rates are above persistence of vision pulses, and the duty cycles during the flashing and continuous or take-down modes, provide substantially constant brightness of illumination from the LED modules 22. Accordingly, two modes are implemented with the multi-mode controller of FIG. 1, namely the first mode, which includes the flashing and continuous—take-down modes, and the second mode, in which the burst or temporary high intensity illumination is generated. There are two internal timers in the microcontroller 10, a first timer which is reset to zero when burst mode is enabled to determine when burst mode has run for 30 seconds, and a second timer which is reset to zero when burst mode is disabled to determine when at least 30 seconds have passed since the last burst mode. While various microprocessors 16 may be used and programmed to obtain the benefits of the invention, it has been found that a type 12 F 675 microprocessor, which is available from the Microchip company of Chandler, Ariz., USA, is suitable.

Referring to FIG. 2, the program in memory of the microcontroller 10 is initiated at start 30. The inputs from the toggle switch 14 are sampled by the microcontroller to determine switch 14 position and the decision made as to whether the continuous—take-down mode is active. This decision is at 32. If the take-down mode is not active, the program tests for the flashing (flash) mode at 34 and the flashing mode is operated if it is on. The programming to obtain pulse rate or pulse width modulation in accordance with an analog voltage level may be implemented by various typical programming techniques. If the take-down mode is active, the microcontroller 10 enables the burst mode to be implemented if desired by the user via function button switch 16. The function button switch 16 is sampled by the microcontroller as to its position, and a decision is made at 36 as to whether the function button switch 16 is pressed. Lacking a function button 16 enablement, the program loops through a decision 48. This down time out of burst mode readies the program for the burst or maximum power mode operation indicated at 40, which is implemented when the function button is pressed, unless the burst mode is locked out by a decision 42 (i.e., value of the second timer is less than 30 seconds), which is no if the function button 16 has recently been pressed, but the system has not been out of the burst mode for more than the temporary period dictated by power level damage thresholds of the LEDs in the modules 22. If this lockout decision 42 is yes (i.e., the value of the second timer is greater than 30 seconds), the burst mode is enabled at block 44 and the first timer is reset to zero. The burst mode then runs 30 seconds at maximum power which is set at 40. If the system has not yet entered at least once the burst mode, the value of the second timer is such that at 42 it has a value above 30 seconds.

The microcontroller 10 checks at 46 whether the burst mode is ongoing, such as by checking a burst mode flag in microcontroller, which was set to yes (or on) when burst mode was enabled, the value of the first timer being below 30 seconds, or by checking whether pulse rate or width is set to the maximum power mode. If the burst mode is ongoing, the microcontroller 10 then checks whether the value of the first timer is more than 30 seconds at 38 thereby assuring that the power level threshold is not exceeded. During burst mode, the microcontroller 10 loops through 38, 40, 46, until check 38 determines first timer value is greater than 30 seconds. If so, the second timer is set to reset to zero, the burst mode flag, if used, is set to no (or off), and the power mode is set by the microcontroller 10 to the pulse rate or width modulation at either the upper or lower power modes, as determined by the input voltage check 48. In other words, when the burst mode is off as indicated by an affirmative decision at 38 or a negative decisions at 42, or negative at 36, the pulse rate or width modulation conditions are then enabled at one of two levels based upon the input voltage from the battery is above 12 volts, which is referred to as the trip point in decision block 48. If the input voltage is below the trip point, then the lower power mode 50 is enabled if the continuous—take-down mode is implemented by the toggle switch 14. If above the trip point, the upper power mode is implemented at the decision 52. The lower power mode provides for pulse width modulation at 35% to 50% of maximum depending upon the battery voltage, and the upper power mode enables pulse width modulation at 65% to 85% of maximum for the flashing mode. The particular percentage of the upper power mode and percentage of lower power mode are determined from the LED manufacturer's specifications.

In summary, there has been described a multimode controller for LED light sources, especially sources in warning lights, such as light bars, provides for a temporary increase in brightness from the LEDs by providing a burst mode, in addition to a flashing mode and a continuous mode. The modes are carried out by programming a microprocessor which receives signals from control switches, which may be pressed and released. The LED light sources receive power from a source, such as a battery. The microprocessor operates control circuits which enables the current to flow through the LEDs. A first mode, which includes a flashing mode and a take-down mode wherein the current through the LED light sources is at a pulse rate which is above the rate of the persistence of vision of the observer, the current is pulse width modulated in accordance with battery voltage variation to maintain the brightness of illumination from the LEDs substantially constant. The pulse width modulated pulses are in groups to obtain selected flashing patterns in the flashing mode or continuously in the take-down mode. The power to the LEDs by virtue of the pulse rate during pulse width modulation and the spacing of the flashes limits the power to the LEDs so that the power damage threshold characteristic thereof is not exceeded. A function button which selects the pattern or burst mode is utilized in the microcontroller during the flashing mode, to obtain different flashing patterns or sequences of flashes from the LEDs. The burst mode can be enabled only during the take-down mode. Then, the LEDs are continuously connected to ground and are operated at the maximum voltage continuously. The programming, however, precludes the burst mode to continue for longer than a predetermined time, for example thirty seconds, and insures that the burst mode has not been on during the thirty seconds prior to being selected, thereby ensuring that the power does not exceed the LEDs damage threshold characteristic. The controller thereby provides for temporary bursting to make visible the region in front of or around an emergency vehicle for a short period of time without the need for light sources dedicated solely to the high intensity brightness mode of operation of a warning light system.

From the foregoing description it will be apparent that there has been provided an improved controller especially suitable for use in LED arrays of warning lamps. Variations of modifications in the herein described controller, within the scope of the invention, will undoubtedly become apparent to those skilled in the art. Accordingly, the foregoing description should be taken as illustrative and not in a limiting sense.

The invention claimed is:

1. A multimode controller for one or more LED light sources which comprises:
    a source of power,
    means for selectively operating said one or more LED light sources by electrically pulsing continuously or intermittently to provide at least a first mode of operation at less than full power from said source, and
    means for operating said one or more LED light sources temporarily in a second burst mode to continuously draw greater power than said first mode from said power source during said second burst mode which enables said one or more LED light sources to provide a burst of illumination greater in brightness than provided in said first mode, said greater power draw being for a period of time which does not exceed a power damage threshold level characteristic of said one or more LED light sources, whereby to facilitate control of a warning light system of an emergency vehicle which contains said LED light sources.

2. The controller according to claim 1 further comprising means for enabling selecting said second mode only when said first mode has been selected thereby switching from said first mode to said second mode.

3. The controller according to claim 1 wherein said first mode providing means further comprises means for providing a flashing mode in which said one or more LED light sources provides a train of pulses of illumination, the duty cycle of the electrical operating pulses being in a train drawing power from said source which is less than said damage threshold power level.

4. The controller according to claim 3 wherein said first mode providing means further comprises means for providing a continuous mode in which said one or more LED sources operate by being pulsed at a rate above the persistence of vision rate of the emergency vehicle operation to appear to provide continuous illumination and which provides said one or more LED sources with said electrical pulses from said power source at a level less than said threshold power level.

5. The controller according to claim 4 further comprising means for enabling selecting of said second mode only when said continuous mode is selected.

6. The controller according to claim 4 wherein said power source provides a voltage output subject to variations in level, and further comprises means for sensing the voltage output of said power source and modulating the rate of the electrical pulses and rate at which the pulsed illumination from said one or more sources appears to be continuous due to the persistence of vision of an observer, inversely with the level of said voltage output so that the brightness of illumination during said first mode appears substantially constant.

7. The controller according to claim 6 wherein said pulse rate is modulated at a rate 35-50% of a maximum rate during said continuous mode and 65-85% of said maximum rate during said flashing mode whereby said illumination brightness is lower during said first mode than during the burst of illumination in said second mode.

8. The controller according to claim 5 further comprising common operation selecting means for selecting said second mode when said continuous mode is selected and for changing the pattern of flashing of said one or more LED sources when said flashing mode is selected.

9. A multimode controller for one or more LED light sources which comprises:
    a source of power,
    a first switch and a computer programmed for selectively operating by electrically pulsing said one or more LED light sources continuously or intermittently to provide at least a first mode of operation at less than full power from said source, and
    a second switch and said computer for operating said one or more LED light sources temporarily in a second, burst mode to continuously draw greater power from said power source than during said first, mode which enables said one or more LED light sources to provide a burst of illumination greater in brightness than provided in said first mode, said greater power draw being for a period of time which does not exceed a power damage threshold level characteristic of said one or more LED light sources, whereby to facilitate control of a warning light system of an emergency vehicle which contains said LED light sources.

\* \* \* \* \*